United States Patent
Chen et al.

(10) Patent No.: US 7,007,095 B2
(45) Date of Patent: Feb. 28, 2006

(54) METHOD AND APPARATUS FOR UNSCHEDULED FLOW CONTROL IN PACKET FORM

(75) Inventors: Edmund G. Chen, Sunnyvale, CA (US); Ravikrishna Cherukuri, San Jose, CA (US); Ruchi Wadhawan, Sunnyvale, CA (US)

(73) Assignee: Redback Networks Inc., San Jose, CA (US)

( * ) Notice: Subject to any disclaimer, the term of this patent is extended or adjusted under 35 U.S.C. 154(b) by 872 days.

(21) Appl. No.: 10/021,152

(22) Filed: Dec. 7, 2001

(65) Prior Publication Data

US 2003/0110303 A1 Jun. 12, 2003

(51) Int. Cl.
*G06F 15/16* (2006.01)
(52) U.S. Cl. .................. 709/230; 709/231; 709/238
(58) Field of Classification Search .............. 709/230, 709/231, 232, 238
See application file for complete search history.

(56) References Cited

U.S. PATENT DOCUMENTS

| | | | |
|---|---|---|---|
| 5,400,329 A | | 3/1995 | Tokura et al. |
| 6,098,103 A * | | 8/2000 | Dreyer et al. ............... 709/234 |
| 6,167,029 A * | | 12/2000 | Ramakrishnan ............ 370/235 |
| 6,421,352 B1 * | | 7/2002 | Manaka et al. ............. 370/445 |
| 6,438,597 B1 | | 8/2002 | Mosberger et al. |
| 6,483,822 B1 | | 11/2002 | Lioy et al. |
| 6,671,758 B1 * | | 12/2003 | Cam et al. .................. 710/100 |
| 6,724,725 B1 * | | 4/2004 | Dreyer et al. .............. 370/231 |
| 6,754,179 B1 * | | 6/2004 | Lin ............................ 370/235 |
| 6,795,881 B1 * | | 9/2004 | Bachrach .................... 710/100 |
| 6,816,465 B1 * | | 11/2004 | Barsoum et al. ........... 370/252 |
| 6,850,523 B1 * | | 2/2005 | Karr et al. ................ 370/395.21 |
| 6,850,526 B1 * | | 2/2005 | Tan et al. ................. 370/395.6 |
| 2002/0122386 A1 * | | 9/2002 | Calvignac et al. ......... 370/230 |
| 2002/0126704 A1 * | | 9/2002 | Cam et al. .................. 370/503 |
| 2003/0184458 A1 * | | 10/2003 | Calvignac et al. ......... 341/102 |

OTHER PUBLICATIONS

PCT/US02/39468 International Search Report, Dec. 9, 2002.
Cam, Richard, et al., "System Packet Interface Level 4 (SPI-4) Phase 2: OC-192 System Interface for Physical and Link Layer Devices," SPI-4 Phase 2 Implementation Agreement, Optical Internetworking Forum, OIF-PLL-04.0, pp. 1-59, Jan., 2001.

(Continued)

*Primary Examiner*—Zarni Maung
*Assistant Examiner*—Van Kim T. Nguyen
(74) *Attorney, Agent, or Firm*—Blakely, Sokoloff Taylor & Zafman LLP (57) ABSTRACT

A method and apparatus for transmitting unscheduled flow control, in packet form, between two chips are described. In one embodiment, a method includes reading a status of a buffer used to receive network packets transmitted from a different chip. The method further includes transmitting to said different chip an unscheduled flow control packet including information about the status of the buffer.

In an embodiment, a chip includes a packet buffer to store network packets transmitted from a different chip, wherein the packet buffer is associated with one or more of a plurality of ports through which the network packets travel. The chip also includes control circuitry, coupled with a packet data bus to receive said network packets from the different chip, and coupled with an unscheduled flow control packet bus to generate and transmit unscheduled flow control packets to the different chip, wherein the unscheduled flow control packets contain information relating to the packet buffer.

34 Claims, 3 Drawing Sheets

OTHER PUBLICATIONS

Data Transfer Case Study: TCP, http://www-net.cs.u-mass.edu/cs653-1997/notesch5/ch5-3.html, pp. 1-6, Sep. 12, 2001.

POS-PHY Level 4, A Saturn Packet and Cell Interface Specification for OCI92 SONET/SDH and 10 Gigabit Ethernet, Interface Specification PMC-1991635, PMC-Sierra, Inc., Issue 6, pp. 1-49, Feb., 2001.

PCT/US02/39468, Dec. 9, 2002, Preliminary Examination Report.

* cited by examiner

METHOD AND APPARATUS FOR UNSCHEDULED FLOW CONTROL IN PACKET FORM

FIELD OF THE INVENTION

The invention relates to the field of networking. More specifically, the invention relates to the transmission of flow control between two integrated circuit chips.

BACKGROUND OF THE INVENTION

Networks are comprised of various network elements, which process and transmit traffic (i.e., network packets such as Internet Protocol ("IP") packets, Ethernet packets, etc.) flowing through the network. Each network element may comprise a number of line cards (which include one or more ports and chips) and control cards (which include one or more chips) to transmit the traffic through the network element. Communications within a network element requires the various chips within a network element to communicate information.

Flow control is a technique for ensuring that a transmitting chip (e.g., a chip on a line card) does not overwhelm a receiving chip with data. Flow control operates to slow or temporarily halt transmission from the source, allowing the recipient, for example, another chip (e.g., another chip on the line card) to unload any stored data. Specifically, a receiving chip can transmit a flow control signal to a transmitting chip, and the transmitting chip can adjust its rate of data transmission accordingly. One such flow control scheme used for chips processing IP packet traffic is the Optical Internetworking Forum System Packet Interface Level 4 Phase 2: OC-192 System Interface for Physical and Link Layer Devices (January 2001) (the "OIF SPI-4.2.2 standard"). This standard is TDM-based (it combines different data streams, such that each data stream is assigned a time slot within a TDM data stream). The time slots are referred to as operating according to a calendar.

Although the OIF SPI-4.2 standard has a low pin count, it suffers from several disadvantages. For instance, network packet transmissions are typically sent in bursts. Because the OIF SPI-4.2 standard does not permit flow control to be transmitted when needed (instead, it requires adherence to the TDM-based calendar), it does not model the bursty nature of IP packet traffic well and therefore, requires additional buffering. In addition, the bandwidth of network packet transmissions can vary widely on a per channel basis. However, since the OIF SPI-4.2 standard uses fixed time slots, variations of bandwidth allocation are difficult to program (one or more time slots must be selected and programmed). In addition, the OIF SPI-4.2 standard requires the programming (initially as well as to add/delete channels) of both the sender and receiver. Further, for the addition or deletion of ports, the OIF SPI-4.2 standard requires that the programming of the calendar of the sender and recipient be in sync. Also, accumulated state information must be maintained for each packet buffer to allow for the delay between when a network packet is received and when flow control information can be transmitted.

SUMMARY OF THE INVENTION

A method and apparatus for transmitting unscheduled flow control, in packet form, between two chips are described. In one embodiment, a method includes reading a status of a buffer used to receive network packets transmitted from a different chip. The method further includes transmitting to said different chip an unscheduled flow control packet including information about the status of the buffer.

In an embodiment, a chip includes a packet buffer to store network packets transmitted from a different chip, wherein the packet buffer is associated with one or more of a plurality of ports through which the network packets travel. The chip also includes control circuitry, coupled with a packet data bus to receive said network packets from the different chip, and coupled with an unscheduled flow control packet bus to generate and transmit unscheduled flow control packets to the different chip, wherein the unscheduled flow control packets contain information relating to the packet buffer.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, packet sender chip 102 can be located in FIG. 1. However, element numbers are the same for those elements that are the same across different Figures.

In the drawings.

DETAILED DESCRIPTION

A method and apparatus for transmitting unscheduled flow control, in packet form, between two chips are described. In the following description, for purposes of explanation, numerous specific details are set forth in order to provide a thorough understanding of the invention. It will be evident, however, to one skilled in the art that the present invention may be practiced without these specific details. In other instances, well-known circuits, structures, and techniques have not been shown in detail in order not to obscure the invention.

Figure 1:
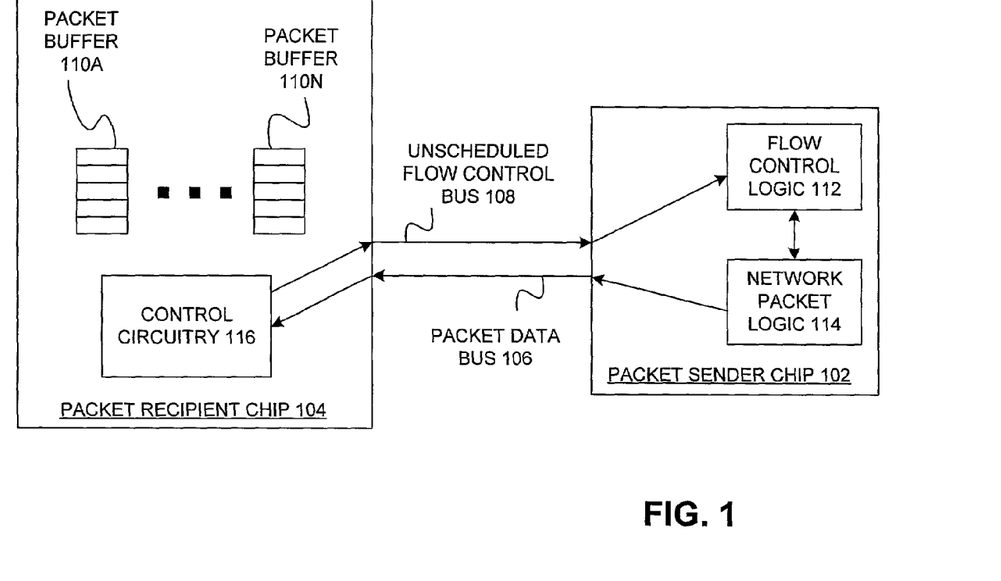
FIG. 1 is a block diagram illustrating portions of a packet sender chip coupled with a packet recipient chip, according to embodiments of the invention.

FIG. 1 is a block diagram illustrating portions of a packet sender chip coupled with a packet recipient chip, according to embodiments of the invention. In particular, FIG. 1 illustrates packet sender chip 102 and packet recipient chip 104, which are coupled together via packet data bus 106 and unscheduled flow control bus 108. Together, packet sender chip 102 and packet recipient chip 104 are, respectively, any sender and recipient of packets in a network element for which flow control is required. For example, packet sender chip 102 and packet recipient chip 104 could be a packet processor, a chip that interfaces the packet processor on a given line card to other line cards, a chip to interface the packet processor to the physical ports, etc.

Packet sender chip 102 can transmit network packets to packet recipient chip 104 over packet data bus 106. While in one embodiment packet data bus 106 is a serial bus, in alternative embodiments packet data bus 106 may be any other kind of bus for the transmission of network packets (e.g., a combination of busses, which when grouped together, provide for the transmission of network packets). In an embodiment, the network packets transmitted over packet data bus 106 can include Internet Protocol ("IP"), asynchronous transfer mode ("ATM"), frame relay, voice-over IP ("VOIP"), point-to-point protocol ("PPP") packets, etc. Packet recipient chip 104 can transmit unscheduled flow control packets to packet sender chip 102 over unscheduled flow control bus 108. While in one embodiment unscheduled flow control bus 108 is a serial bus, in alternative embodiments unscheduled flow control bus 108 may be any other kind of bus for the transmission of network packets (e.g., a combination of busses, which when grouped together, provide for the transmission of unscheduled flow control packets).

Packet recipient chip 104 comprises packet buffers 110A–N (collectively, "packet buffer 110") to temporarily store the network packets received from packet sender chip 102. The network packets are each associated with a port through which the network packets are transmitted out of the network element. The ports may be physically further downstream or coupled with packet recipient chip 104. In one embodiment, packet buffer 110 can operate in two modes: 1) in the port specific mode there are dedicated packet buffers for each particular port through which network packets will flow; and 2) in the aggregated port mode there are shared packet buffers for all of the ports. However, alternative embodiments of the invention can support more, less, and/or different buffer modes.

Packet recipient chip 104 further comprises control circuitry 116, which is coupled with unscheduled flow control bus 108 and packet data bus 106, to receive the network packets from packet sender chip 102 and to generate and transmit unscheduled flow control packets to packet sender chip 102. Packet sender chip 102 further comprises flow control logic 112, coupled with unscheduled flow control bus 108, to receive the unscheduled flow control packets from packet recipient chip 104. Packet sender chip 102 further comprises network packet logic 114, coupled with packet data bus 106 and flow control logic 112, to modify, in response to the unscheduled flow control packets, a rate at which the network packets are transmitted to packet recipient chip 104.

In an embodiment, packet recipient chip 104 further transmits the network packets received from packet sender chip 102 to another chip (e.g., another chip on the line card). In such an embodiment, flow control information may be required between packet recipient chip 104 and the chip to which it transmits network packets. In such an embodiment, packet recipient chip 104 is coupled with the other chip via another unscheduled flow control bus and another packet data bus, which operate in a similar manner as unscheduled flow control bus 108 and packet data bus 106, respectively. In such an embodiment, packet recipient chip 104 further comprises flow control logic and network packet logic, which operate in a similar manner as flow control logic 112 and network packet logic 114, respectively. In such an embodiment, the other chip comprises packet buffers and control circuitry, which operate in a similar manner as packet buffers 110A–N and control circuitry 116, respectively.

Figure 2A:
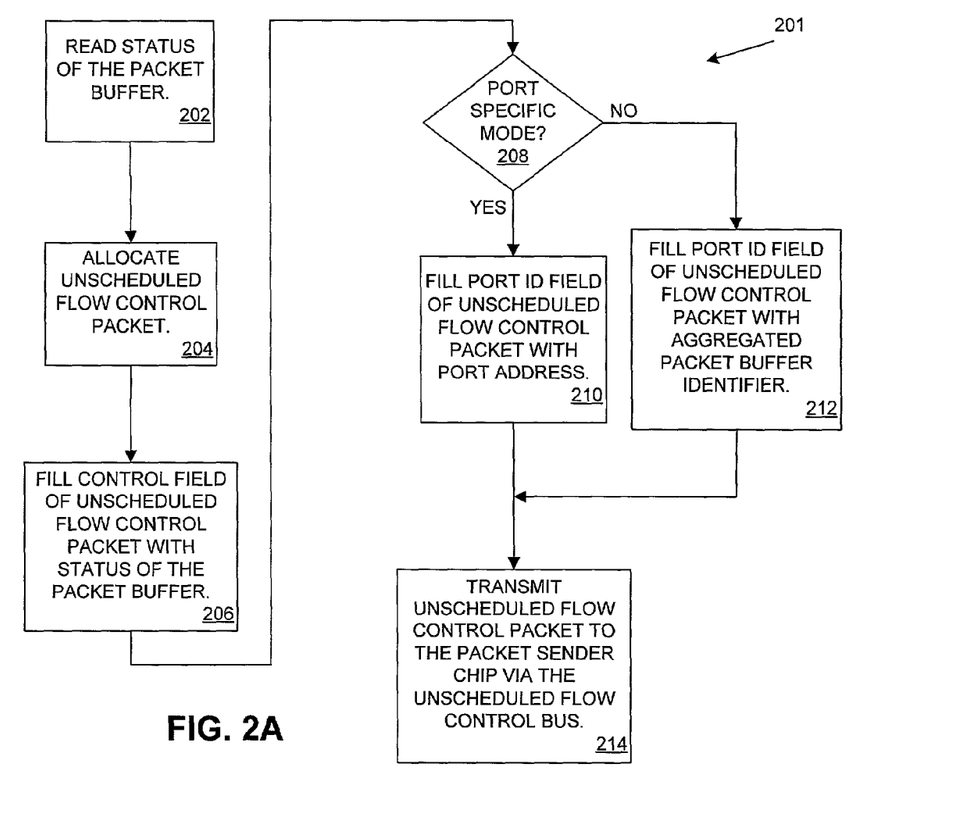
FIG. 2A illustrates a flow diagram for the transmission of unscheduled flow control packets, according to embodiments of the invention.

FIG. 2A illustrates a flow diagram for the transmission of unscheduled flow control packets, according to embodiments of the invention. In one embodiment, the flow diagram 201 is performed each time packet buffer status information needs to be sent (i.e., it need not follow a calendar). Checking whether status information for a given packet buffer (or the aggregate packet buffer) needs to be sent can be done at any number of different times (e.g., each time a network packet is received in packet buffer, when the packet buffer is idle for a predetermined period of time, etc.).

Figure 2B:
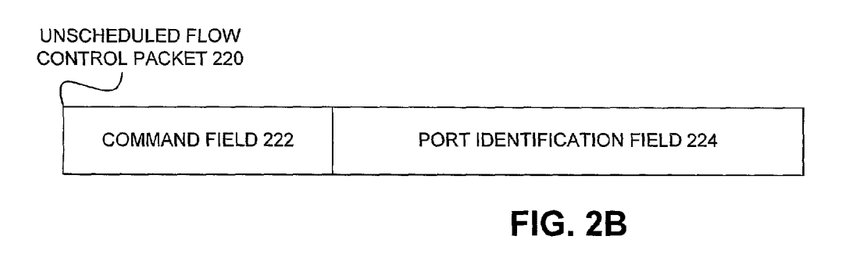
FIG. 2B illustrates an unscheduled flow control packet according to embodiments of the invention.

Flow diagram 201 begins at process block 202, where the status of the packet buffer is determined. At process block 204, an unscheduled flow control packet is allocated. FIG. 2B illustrates an unscheduled flow control packet 220 according to embodiments of the invention. In one embodiment, unscheduled flow control packet 220 comprises command field 222 and port identification field 224. Command field 222 comprises the command to packet sender chip 102, e.g., idle, full, reserved, Xon, Xoff, credit acknowledgements, etc. In one embodiment, the command field 222 supports OIF SPI-4.2 commands. Table 1, appearing below, includes supported OIF SPI-4.2 commands.

TABLE 1

Flow Control Commands

| Field | Bit | Description |
|---|---|---|
| Type | 3:2 | Command Type |
|  |  | 2'b00: Idle |
|  |  | 2'b01: Reserved |
|  |  | 2'b10: Max 1 Ack |
|  |  | 2'b11: Max 2 Ack |
| DIP-2 | 1:0 | DIP-2 Code |
| Port In | n:0 | Port Identification |

Port identification field 224 comprises the address of the port through which network packets will travel or an aggregated packet buffer identifier (as discussed below).

Returning to FIG. 2A, at process block 206, the command field is filled with the command for network packet transmissions intended for the packet buffer. At decision block 208, it is determined whether the packet buffer is in port-specific mode or aggregated port mode. If the packet buffer is in port-specific mode, the port identification field in the unscheduled flow control packet is filled with the address of the port to which the packet buffer is associated, at process block 210. If the packet buffer is in aggregated port mode, the port identification field in the unscheduled flow control packet is filled with an aggregated packet buffer identifier, at process block 212. In an embodiment, the aggregated packet buffer identifier is a predetermined combination of bits that indicates that packet buffer 110 is being used in the aggregate for all ports. Unlike the prior art, where specific time slots are allocated for a particular port, the unscheduled flow control packets may be sent (if port-specific mode, then in regard to any port as well) at any time.

At process block 214, the unscheduled flow control packet is transmitted to packet sender chip over unscheduled flow control bus. While in one embodiment, the unscheduled flow control packets may be variable in size (depending on the contents of the command and port identification fields), alternative embodiments use a fixed size. In an embodiment, unscheduled flow control bus 108 is comprised of five lines: four lines for port information and one line for control information. However, other embodiments may include a different number of lines and a different allocation among the lines. In addition, one embodiment supports both unscheduled flow control packets and the OIF SPI-4.2 standard. This embodiment includes a mechanism to indicate which mode to operate in: the unscheduled flow control packet mode or the OIF SPI-4.2 standard mode. In addition, this embodiment uses a subset of the pins used for the unscheduled flow control packet mode for the OIF SPI-4.2 standard mode. Table 2, appearing below, includes pins used for unscheduled flow control packet mode.

TABLE 2

Enhanced Flow Control Pins

| Pin Name | Number Pins | I/O Type | Description |
|---|---|---|---|
| Clk | 2 | LVDS | Status Clock |
| Ctl | 2 | LVDS | Status Control |
| Dat[3:0] | 8 | LVDS | Status Data |
| TOTAL | 12 |  |  |

Timing Chart 1 illustrates the flow control timing of the pins included in Table 2.

Specifically, the control line and two of the data lines are used when operating in the OIF SPI-4.2 standard mode.

In one embodiment, unscheduled flow control bus 108 permits unscheduled flow control packets to be transmitted to packet sender unit 102 faster than network packets are transmitted to packet recipient unit 104, thus negating the need for storing any accumulated packet buffer state. In an embodiment, unscheduled flow control bus 108 is a serial bus, but embodiments of the present invention are not so limited. For example, in another embodiment, unscheduled flow control bus 108 is a multi-bit parallel bus. In an embodiment, unscheduled flow control packets take five clock cycles for transmission, and as stated previously, are transmitted whenever flow control information is necessary.

Transmitting flow control information in a packet form (that identifies the packet buffer) whenever flow control is necessary (i.e., unscheduled) provides several distinct advantages. For instance, such unscheduled flow control packets model well the bursty nature of network packet transmissions. In addition, the allocation of bandwidth between channels is achieved merely by adjusting the frequency of flow control packet transmissions for different packet buffers on an as needed basis. Further, a calendar on both the flow control sender and receiver need not be programmed and reprogrammed. Rather the flow control sender generates flow control packets (that identify the packet buffer to which they apply) on an as needed basis (synchronication is not an issue).

Figure 3:
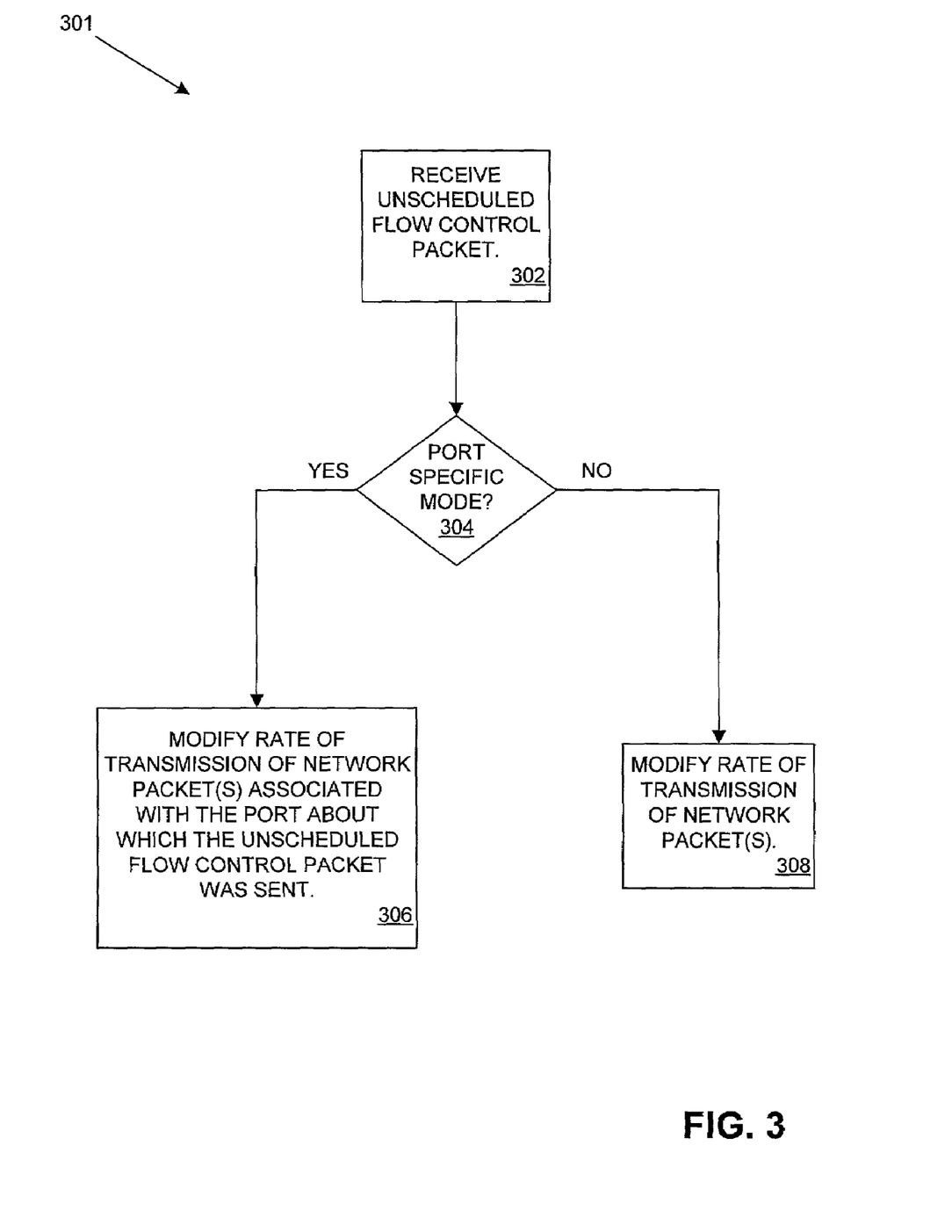
FIG. 3 illustrates a flow diagram for the receipt of unscheduled flow control packets and the modification of a rate of transmission of network packets, according to embodiments of the invention.

FIG. 3 illustrates a flow diagram for the receipt of unscheduled flow control packets and the modification of a rate of transmission of network packets, according to embodiments of the invention. In particular, FIG. 3 illustrates flow diagram 301, which is executed each time an unscheduled flow control packet is received by the packet sender chip. At process block 302, the unscheduled flow control packet is received by the packet sender unit. At process block 304, it is determined if the packet buffer is being operated in port-specific mode. In one embodiment, the packet sender chip determines this by examining the port identification field (which was filled accordingly, in flow diagram 201). Specifically, the port field will contain either the address of a specific port (port-specific mode) or the aggregate packet buffer identifier. If operating in port-specific mode, the packet sender chip modifies the rate at which network packets associated with the particular port referenced in the unscheduled flow control packet are sent (process block 306). If operating in the aggregated port mode, then the packet sender chip modifies the rate at which all network packets are transmitted to the packet recipient chip regardless of their port association (process block 308).

The line cards and control cards included in the different network elements include memories, processors, and/or Application Specific Integrated Circuits ("ASICs"). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM), random access memory (RAM), magnetic disk storage media; optical storage media, flash memory devices, electrical, optical, acoustical, or other form of propagated signals (e.g., carrier waves, infrared signals, digital signals, etc.), etc.

Thus, a method and apparatus for transmitting unscheduled flow control, in packet form, between two chips have been described. Although the present invention has been described with reference to specific exemplary embodiments, it will be evident that various modifications and changes may be made to these embodiments without departing from the broader spirit and scope of the invention. For example, different input formats may be used. Accordingly, the specification and drawings are to be regarded in an illustrative rather than a restrictive sense.

What is claimed is:

1. A method, comprising:

reading a status of a buffer used to receive network packets transmitted from a different chip; and transmitting to said different chip an unscheduled flow control packet including information about the status of the buffer wherein the buffer is associated with a port through which the network packets travel and further wherein the network packets are transmitted according to an assigned time slot in a TDM (time division multiplex) data stream.

2. A method, comprising:

reading a status of a buffer used to receive network packets transmitted from a different chip; and transmitting to said different chip an unscheduled flow control packet including information about the status of the buffer;

wherein the buffer is associated with an aggregate of ports through which different ones of the network packets travel and further wherein the network packets are transmitted according to an assigned time slot in a TDM (time division multiplex) data stream.

3. The method of claim 1, wherein the network packets are Internet protocol ("IP") packets.

4. The method of claim 1, wherein each network packet is associated with the port through which the network packet will travel.

5. A method, comprising:

receiving a network packet from a sender chip, wherein the network packet was transmitted during a first period within an assigned time slot in a TDM (time division multiplex) data stream;

storing the network packet in a packet buffer, wherein the packet buffer is associated with a port through which the network packet will travel;

generating an unscheduled flow control packet, wherein the unscheduled flow control packet comprises information relating to the packet buffer; and transmitting the unscheduled flow control packet to the sender chip, wherein the unscheduled flow control packet is transmitted during a second period, and wherein the second period is shorter than the first period.

6. The method of claim 5, wherein the unscheduled flow control packet comprises control data and port data.

7. The method of claim 6, wherein the port data comprises a bit pattern that is associated with a further packet buffer being used in the aggregate.

8. The method of claim 6, wherein
the control data requires one clock cycle for transmission during the second period, and wherein the port data requires four clock cycles for transmission during the second period.

9. The method of claim 6, wherein
the control data includes a command from the Optical Internetworking Forum SPI-4 Phase 2 Implementation Agreement.

10. A method comprising:
periodically receiving network packets from a sender chip;
storing the network packets in a packet buffer; and
periodically transmitting flow control data back to the sender chip based on a status of the packet buffer and without regard to a calendar,
wherein the flow control data comprises information relating to the packet buffer,
and wherein each of said periodic transmissions of flow control data is faster than transmission of one of said network packets.

11. The method of claim 10, wherein
the packet buffer is associated with a port through which the network packets travel.

12. The method of claim 10, wherein
the packet buffer is associated with an aggregate of ports through which different ones of the network packets travel.

13. The method of claim 10, wherein
the network packets are Internet protocol ("IP") packets.

14. The method of claim 10, wherein
each network packet is associated with a port through which the network packet will travel.

15. A method, comprising:
receiving an unscheduled flow control packet from a different chip; and
modifying a rate at which a network packet is transmitted to said different chip, based on information in the unscheduled flow control packet;
wherein the network packet is transmitted according to an assigned time slot in a TDM (time division multiplex) data stream.

16. The method of claim 15, wherein
the recipient unit includes a buffer,
wherein the unscheduled flow control packet comprises control data and port data, and
wherein the unscheduled flow control packet is associated with the buffer.

17. The method of claim 16, wherein
the buffer is associated with an aggregate of ports through which different ones of the network packets travel, and
wherein the port data comprises a bit pattern that that is associated with the buffer being used in the aggregate among all available ports.

18. The method of claim 16, wherein
the buffer is associated with a port through which the network packet will travel, and
wherein the port data comprises a bit pattern that corresponds to the address of the port.

19. The method of claim 16, wherein
the control data includes a command from the Optical Internetworking Forum SPI-4 Phase 2 Implementation Agreement.

20. A method, comprising:
receiving an unscheduled flow control packet from a recipient chip during a second period,
wherein the second period is shorter than a first period during which a network packet is transmitted to the recipient chip,
wherein the unscheduled flow control packet comprises information relating to a packet buffer within the recipient chip,
wherein the packet buffer is associated with a port; and
modifying a rate at which network packets are transmitted to the recipient chip based on the information in the unscheduled flow control packet, and
wherein the network packet is transmitted according to an assigned time slot in a TDM (time division multiplex) data stream.

21. The method of claim 20, wherein
the unscheduled flow control packet comprises control data and port data.

22. The method of claim 21, wherein
the port data comprises a bit pattern that that is associated with the packet buffer being used in the aggregate among all available ports.

23. The method of claim 22, wherein
the port data comprises a bit pattern that corresponds to the address of the port.

24. The method of claim 22, wherein
the control data requires one clock cycle for transmission during the second period, and
wherein the port data requires four clock cycles for transmission during the second period.

25. The method of claim 22, wherein
the control data includes a command from the Optical Internetworking Forum SPI-4 Phase 2 Implementation Agreement.

26. A chip, comprising:
a packet buffer to store network packets transmitted from a different chip, wherein the packet buffer is associated with one or more of a plurality of ports through which the network packets travel; and
control circuitry, coupled with a packet data bus to receive said network packets from the different chip, and coupled with an unscheduled flow control packet bus to generate and transmit unscheduled flow control packets to the different chip,
wherein the unscheduled flow control packets contain information relating to the packet buffer and
further wherein the network packets are transmitted according to an assigned time slot in a TDM (time division multiplex) data stream.

27. The chip of claim 26, wherein
the unscheduled flow control packet comprises control data and port data.

28. The chip of claim 27,
wherein the packet buffer is associated with all of the plurality of ports, and
wherein the port data comprises a bit pattern that is associated with the packet buffer being used in the aggregate among all available ports.

29. The chip of claim 28, wherein
the packet buffer is associated with one of the plurality of ports, and
wherein the port data comprises a bit pattern that corresponds to the address of the port.

30. A chip, comprising:
flow control logic, coupled with an unscheduled flow control packet bus to receive an unscheduled flow control packet from a different chip; and network packet logic, coupled with a packet data bus and the flow control logic, to modify, in response to the unscheduled flow control packet, a rate at which network packets are transmitted to the different chip, wherein each of the network packets is associated with one of a plurality of ports through which that network packet will travel and wherein the network packets are transmitted according to assigned time slots in a TDM (time division multiplex) data stream.

31. The chip of claim 30, wherein the different chip includes a buffer, wherein the unscheduled flow control packet comprises control data and port data, and wherein the unscheduled flow control packet is associated with the buffer.

32. The chip of claim 31, wherein the buffer is associated with all of the plurality of ports, and wherein the port data comprises a bit pattern that that is associated with the buffer being used in the aggregate among all available ports.

33. The chip of claim 31, wherein the buffer is associated with one of the plurality of ports through which the network packet will travel, and wherein the port data comprises a bit pattern that corresponds to the address of the port.

34. The chip of claim 31, wherein the control data includes a command from the Optical Internetworking Forum SPI-4 Phase 2 Implementation Agreement.

* * * * *